United States Patent

[11] 3,596,388

[72] Inventor James R. Shorten
526 Campbell St., Scranton, Pa. 18505
[21] Appl. No. 825,693
[22] Filed May 19, 1969
[45] Patented Aug. 3, 1971

[54] INFORMATION CONTROL SYSTEM AND APPARATUS
9 Claims, 22 Drawing Figs.
[52] U.S. Cl. ................................................. 40/19.5,
35/24, 40/2, 40/124, 282/23, 283/55
[51] Int. Cl. .................................................... G09f 3/18,
B41l 1/24
[50] Field of Search ........................................... 35/24, 24
A, 24 B; 40/19.5, 124, 124.2; 116/130

[56] References Cited
UNITED STATES PATENTS

| | | | |
|---|---|---|---|
| 618,388 | 1/1899 | Beecham | 40/19.5 |
| 1,756,040 | 4/1930 | Taft | 116/130 |
| 2,098,944 | 11/1937 | Ceder | 116/130 |
| 2,192,679 | 3/1940 | Kimball | 40/19.5 |
| 2,412,238 | 12/1946 | Wassell | 35/24 B X |
| 3,403,458 | 10/1968 | Mendell | 35/24 A |

Primary Examiner—Wm. H. Grieb
Attorney—Strauch, Nolan, Neale, Nies & Kurz

ABSTRACT: An information control system and informational display board employing centralized visual accumulation and display of inventory and sales data, equipment location, departure and arrival data, and similar information in predelineated transversely related and variable columnar order to provide a substantially instantaneous overall picture of day-to-day or other periodic business progress and/or inventory status. The display board is adapted for variable sectionalization through use of removable elastic divider tapes end fastened through terminal ring hooks to equispaced, oppositely aligned hook elements disposed in peripheral bounding relation to the marginal edges of the board and/or hook carrying removably mountable sectionalize strips mounted on the board face and to receive color coded informational tag sections identifying inventory on hand and sold or hand written informational data respecting location, departure and/or arrival information respecting equipment used in carrying on a business.

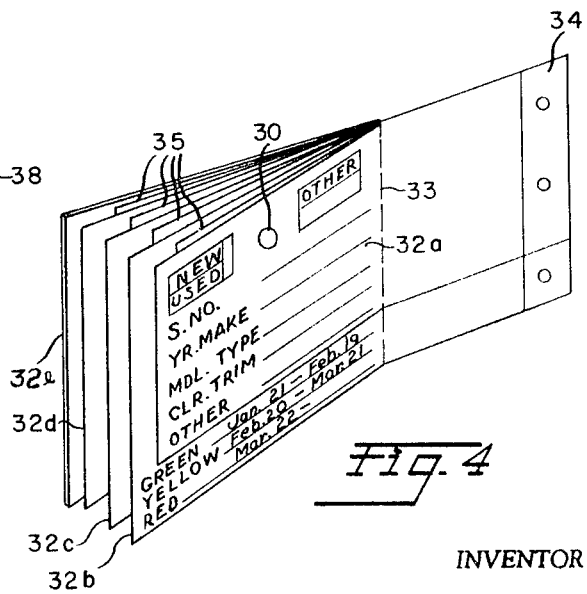
Fig. 2
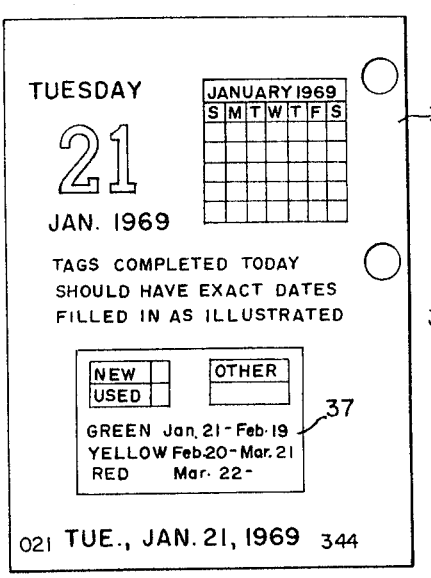
Fig. 6
Fig. 4
INVENTOR
JAMES R. SHORTEN
BY Strauch Nolan Neale Nies + Kurz
ATTORNEYS Fig. 3
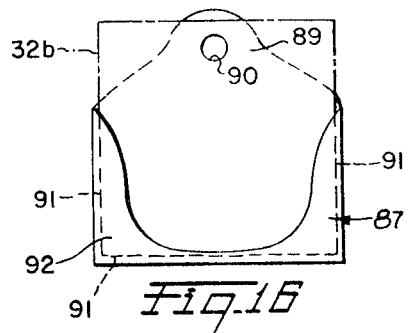
Fig. 14
Fig. 15
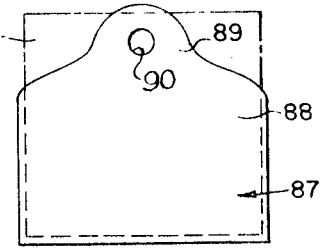
Fig. 16
Fig. 17
INVENTOR
JAMES R. SHORTEN
BY Strauch Nolan Neale Nies + Kurz
ATTORNEYS

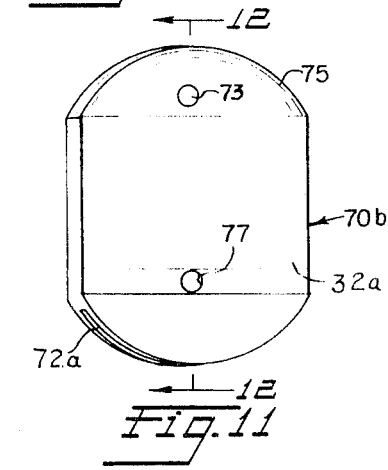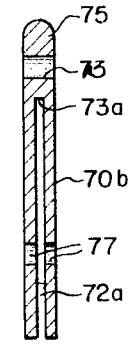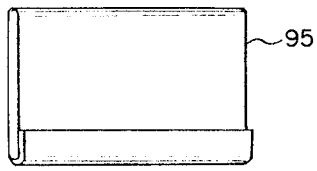

INFORMATION CONTROL SYSTEM AND APPARATUS

BACKGROUND OF THE INVENTION

This invention relates generally to an information control system and has particular usefulness in providing a sales and inventory control system, for example, in automobile sales or like businesses or equipment locating and operation information, for example, in trucking businesses or passenger transportation businesses such as airlines enabling a businessman or a business organization to project needs within good business practice and to quickly and immediately determine the current status of the business or business operation and readily identify inventory items presently in stock and/or prospectively to be stocked and sold and the length of time particular inventory items have been in stock or are anticipated to be on hand for sale.

In the past, various type information control systems and control boards have been utilized to give an indication of the various stock items on hand, the length of time for which these various items have been in stock and equipment operation status. While these prior systems and devices have been helpful in many instances, they have been somewhat limited in usage by their overall lack of versatility and their failure to give an immediate and instantaneous visual indication of the current status of a particular business or its operation. In addition some of the prior art devices have been quite expensive, and because of their lack of versatility and limited usefulness, have been unacceptable in many businesses, particularly to small and cost conscious businessmen.

SUMMARY OF THE INVENTION

Accordingly, the primary object of this invention resides in the provision of a novel information control system in which an accurate and ready visual display of sales and inventory stock items and equipment operations is maintained from time to time, the system including an information control board which is sectionalized and systematically posted to provide an immediate visual indication of the overall status of the particular business involved, along with critical information relative to each individual stock item or the location, arrival, departure, and similar information respecting individual units of equipment used in the business.

Another object resides in the provision of a novel information control system adaptable to various types of businesses to provide a visual control record of the various stock items received and disbursed and to give an immediate visual indication of the status of each individual item from the time of its receipt to its disbursement or the operational status and anticipated arrival, departure, and location of operational equipment employed in transportation businesses.

Still another object resides in the provision of a novel inventory control system involving a process of simultaneously applying information relative to a particular stock item onto the various sections of a multisection tag, distributing the various tag sections to locations where the presence of the particular information is desirable, one of the locations being a novel changeable sales and inventory control board maintained on a current basis of a color-coded tag system which renders an immediate visual indication of the current status of the overall business operation and also renders an immediate indication of the current status of any particular stock item on hand or handled or piece of operational equipment over a specified time period.

Still another object resides in the provision of a novel, readily changeable and versatile sales and inventory control board which may be readied by suitable readily variable divider strips for use in various different kinds of business ventures to provide pertinent information in a number of related sectional areas, the size of which may be varied by repositioning of readily removable flexible divider strips and removable hook containing separator strips on the control board to provide areas for visual display varying information. A novel multisection tag is used with the control board along with a color code system to render an immediate visual indication of the current status of various items of stock on hand or sold and to give an overall picture of the business operation over a specified period of time.

Another object resides in the provision of a novel changeable sales and inventory control board the indicating regions of which may be varied in size to receive a predetermined number of tags or tags of varying size representing a particular item of stock or operational equipment this number corresponding generally to the number of items which is considered acceptable within good business practice. In this manner the board may be used to project and control good business practice by indicating when a particular item is either understocked or overstocked.

A further object resides in the provision of a novel multisection information tag upon the several sections of which pertinent information relative to an individual items is simultaneously placed upon receipt or dispatching of the item, the various tag sections of which may then be distributed to different display locations at which it is desirable to have the information pertinent to that specific item readily available. Several of the tag sections are preferably of different color for use on the above novel inventory control board in accord with a color code system to indicate the length of time the various stock items have been on hand or current area in which the item is operating. Alternatively, the various tag sections may all be a single color such as white, with the color code system being provided by different colored transparent cover plates which hold the tags firmly against the board.

Another object resides in the provision of a novel key holder capable of receiving at least one of the sections of the multisection tag described above, the key holder comprising a clear plastic enclosure with hanger passages disposed to support the holder from the board in a properly oriented tag reading position with the attached normal key chain carrying a key depending therefrom.

Still another object of the present invention resides in the provision of magnetic or pressure sensitive adhesive backed tag hangers which may be readily placed on and removed from the face of the display board to suspend the board mounted tag sections in slightly spaced relation from the board face for ready separation and/or removal in effecting current posting of the board.

Further objects and advantages will become apparent from reading the following detailed description of various embodiments of the invention with reference to the illustrative drawings, the invention however being limited only by the appended claims.

BRIEF DESCRIPTION OF THE DRAWINGS

FIG. 2 is a front view of a board similar to FIG. 1, but omitting the preferred coloring and providing sectionalized areas varied in size and arrangement to render the board more versatile in both the type and amount of information which the board may immediately visually convey;

FIG. 3 is a front view of a board similar to FIG. 1 but omitting the preferred coloring and providing sectionalizing areas varied in size and arrangement to visually convey still different information;

FIG. 4 is a perspective view of a five-section multisection tag pack which may be employed in applicant's inventory control system and used with the control board arranged as shown in FIGS. 1 to 3;

FIG. 5 is a sectional view along lines 5-5 of FIG. 1 illustrating how the variously color coded sections of the multisection tag pack of FIG. 4 and the cover plate or colored coding plates provided by this invention are retained on the control board;

FIG. 6 is a front view of a specially printed calendar provided for prescribing the termination dates to be applied to board displayed tag sections of the multisection tag pack of FIG. 4 on a prescheduled 60day sales disposal plan in accord with the stock item received date involved;

FIG. 7 is a sectional view along line 7-7 of FIG. 1 indicating the manner in which the removable, flexible, extensible divider strips are maintained flatly against the face of the information control board;

FIG. 8 illustrates a tag and key holder adapted to receive one or back-to-back pairs of duplicate printed tag sections from a multisection tag pack similar to that shown in FIGS. 4 or 14 in carrying out an automobile sales business inventory system;

FIG. 9 illustrates a laterally elongated tag holder having a slot adapted to support the laterally printed tag in a properly oriented readable position and receive a key chain and key;

FIG. 10 illustrates a magnetic base key holder board support post on which the tag holder of FIG. 9 may be supported;

FIG. 11 is a front view of an alternate form of tag and key holder to be used in place of that of FIG. 8 which eliminates the need of perforating the tag sections to match the holder passages for the support post and key chain;

FIG. 12 is a vertical section taken substantially on line 12-12 of FIG. 11;

FIG. 13 illustrates a tag holder similar in construction to the tag and key holder of FIG. 8 adapted to receive one or back-to-back pairs of printed tag sections from a multisection tag pack similar to that shown in FIG. 14 and used as a stock tag on the automobile described by the tag;

FIG. 14 is a perspective view of an eight section multisection tag pack preferably employed in applicant's inventory control system of an automobile sales business inventory system;

FIG. 15 is a back view of the final tag section of the multisection tag pack of FIG. 14;

FIGS. 16 and 17 are respectively front and back views of a tag holder adapted to receive the vary colored tag sections and display them on the inventory control board of FIGS. 1, 2 or 3;

FIG. 18 is an "expected stock" tag provided to post the inventory control boards of FIGS. 1, 2 or 3 to show a "traded in" or purchased used car expected to be in inventory on the date shown thereon;

FIG. 19 is an "expected stock" tag provided to post the inventory control board of FIG. 2 to show and "on order" new car and the location thereof;

FIG. 20 is a vertical sectional view of a column header plate or sectionalizing divider strip employed in the inventory control boards of FIGS. 1, 2 or 3 or the flight and truck control boards of FIGS. 21 and 22;

FIG. 21 is a fragmental front view of a board similar to that of FIG. 1 sectionalized, headed and arranged according to this invention to serve as an airplane arrival and departure information display board; and FIG. 22 is a fragmental front view of a board similar to that of FIG. 1 sectionalized, headed and arranged according to this invention to serve as a truck location and destination information display board.

DETAILED DESCRIPTION OF ONE EMBODIMENT OF THE INVENTION

Figure 1:
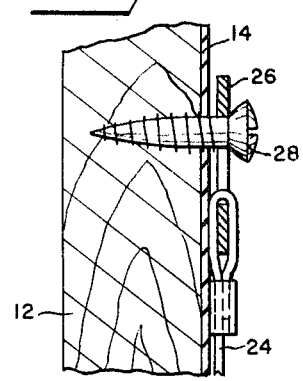
FIG. 1 is a front view of an information control board arranged in preferred coloring according to the present invention to render the sectionalizing tapes and attachment means hidden in the margins and header stripping and to provide an immediate visual indication of the operation of a used car sales business, the board indicating the inventory status of the business, namely, the number and types of cars presently on hand and the number and type of cars which have been sold during a current operational time period.

Referring now to FIG. 1 a novel information control board 10 constructed in accord with the invention is shown and will be described as adapted for usage in sales and inventory control of a used car business. It, however, is to be understood that it may be readily employed in other types of business enterprises as hereinafter exemplified in FIGS. 2, 3, 21 and 22.

Board 10 comprises a base 12 which may be wood, metal plastic or other suitable material having a smooth front-face which may be of plastic or a thin metallic magnetic material of a distinctive base color, for example white having solid black or other colored margins and sectionalizing header strips 11 and 13. The face 14 showing through in delimited white areas is divided into a number of informational areas, including main title regions 16 and 18 respectively, upper and lower stock indicating areas 20 and 22. Each of the latter areas is divided into a plurality of various sized vertical columns and horizontal rows by flexible extensible divider strips or ribbons 24 having end attachment rings or hooks 26 which fit over conical head screws 28 (white spots FIG. 1) threaded into and equally spaced along the black or other colored peripheral margins or regions 20 and 22 as best seen in FIG. 7. To assure that the screw head, rings or hooks 26 and divider strips or ribbons 24 will merge visually into the margins and header strips 11 and 13, these component elements are colored the same as the margins and header strips (black as illustrated). In typical arrangements as depicted in the several embodiments disclosed, the screws 28 are disposed in rows at spaced intervals of 2 inches so the informational display areas will all be 2 inches in height and either 2 inches or multiples of 2 inches in width. Such spacing has been found to be adequate for a sales inventory control board but it is to be understood that any larger basic dimension may be chosen to assure ready readability if more distant viewing of the board is required. As seen in FIG. 7, the conical inclined back face of the head of the screws 28 cammingly forces hook 26 and strips 24 carried thereby toward the board face 14 causing strips 24 to closely hug face 14 providing a neat appearing divided board face accurately defining and visually accenting the vertical columnar and horizontal row division of the board face.

While the contrasting colored margins and divider strips may be formed either by painting the board face or by inlaying differently colored plastic or magnetic strips in the desired areas on the face of base 12, FIG. 1 depicts a board wherein the upper marginal area is a multiple height painted margin with the letters therein formed by letter shaped pressure sensitive or magnetic backed material and the header strips 11 and 13 are, respectively, an exposed area of board face 14, the latter having magnetic or pressure adhesive backed lettering arranged therein and a painted area formed like the upper margin. Title blocks at the top of the columns and to the left of each horizontal row as seen in FIG. 1 can be formed either of magnetic or pressure adhesive backed lettering as previously pointed out or preferably are formed of preformed strip assemblies composed of a rectangular platelike metal body 29 (FIG. 20) of a length which is a multiple of the spacing of screws 28, a preprinted adhesive backed face covering 30 having a background matching board face 14 in color and of a length to wrap around the ends of metal body 29, and having a permanent magnet M centered on the back face of metal body 29 for mounting it in a selected space on board face 14. The inturned ends of face covering 30 are preferably cut off to be laterally outward from the ends of magnet M as indicated by the unsectioned turned in end dotted behind magnet M in FIG. 20. The printing on face covering 30 is centered between the opposite ends of the covering and designates the name of the inventory of stock to be recorded in each column and subordinate row identification word, for example, the year date of the particular make of automobile as illustrated at the left in FIGS. 1, 2, and 3.

Referring for the moment to the header strip 13 of FIG. 1, the length of strip 13 is equal to the spacing between the vertical marginal areas and the lettering is laterally spaced to fill the free space between adjacent vertical divider strips or ribbons 24, the lettering indicating the month, day, and year being changeable letters formed by magnetic or pressure adhesive backed letters. As a consequence, the overlying portions of divider strips or ribbons 24 fall between the letters and being of the same color as the background area of strip 13 visually merge into the background in the completely arranged board as do the end fasteners 26 and screws 28 provided for securing divider strips or ribbons 24 to the board face 14.

As shown in FIG. 1, the board is arranged to control the sales and inventory of a used car business dealing primarily in Chevrolet automobiles. The bands 24 are suitably spaced to provide vertical columns of varying width in multiples of 2 inches with each column suitably labeled to represent a different make car such a Chevrolet, Pontiac, Buick, etc. Each horizontal row represents the year in which the inventoried cars of each column were manufactured as indicated by suitable inventory tag sections or other labelling applied in side-by-side relation to face 14 of the board 10.

Upper region 20 of FIG. 1 is adapted to display identifying tag sections representative of the number and type of cars presently in stock, while lower region 22 is adapted to display identifying tag sections representative of the cars sold as of a particular date shown on title strip 13. The titles appearing in regions 16 and 18 and on divider strip 13, and the letters and numbers indicating the make and year of car, being preferably formed by either magnetized letters or plate members bearing indicia and magnetized backing strips, or printed pressure sensitive paper as heretofore described, are readily removable from and replaceable on face 14.

For each car received in stock, appropriate sections of an identification tag pack 32 (FIG. 4) through apertured at 30 adapting them to be placed on suitable magnetic, screw in, or nail type support pegs 31 fixedly mounted in appropriate laterally centered fashion adjacent the upper ends of the 2inch spaces in area 20.

Referring for the moment to FIG. 4, tag pack 32 may take any desired form but is preferably a specially designed multileaved tag pack comprising an interleaved tag pack composed of vary colored similarly imprinted sheets or plain sheets providing blank spaces for entering descriptive information respecting the inventoried stock, a single writing only on the top sheet being sufficient to fill in the several leaves through employment of interleaved carbons sheets 35 or treated self carbon-backed paper. In this specifically disclosed pack, the leaves provide tag sections 32a of plain white, 32b, 32c, 32d and 32e respectively of green, yellow, red and white. All leaves are perforated along line 33 to define respective tag sections having laterally centered top openings 30 and have stub sections secured together along marginal area 34 by adhesive or other suitable means. The tag sections 32b, 32c, 32d and 32e are square and generally correspond in size to the spacing between screws 28, the tag section 32e preferably comprising a hard board material for a purpose to be hereinafter pointed out.

Each of the tag sections has indicia generally descriptive of automobile sales information printed thereon identical to that shown on top section 32a. However, top section 32a is shorter in height than sections 32b, 32c, 32d and 32e the lower portion of each of which extends downwardly beyond section 32a and has additional informational printing thereon as shown in FIG. 4 useful when the tag sections are used in accord with a disposal plan for the stock in trade predicated on the age of the stock as hereinafter pointed out. Carbon sheets 35 placed between adjacent tag sections and fixed therebetween along marginal area 34 terminate short of the free edges of the tag sections 32a, 32b, 32c, 32d, 32e opposite marginal area 34 to enable the free ends of the tag sections to be gripped with one hand when tearing along line 33 by gripping section 34, including the stub sections of carbon sheets 35, with the other hand and pulling the stub sections away from sections 32a to 32e to separate the stub sections and carbon sheets for disposal. Alternatively, carbon backed paper may be used for making sections 32a to 32d, thus obviating the need for carbons sheets 35.

When a car is initially received in stock, the information indicated on tag section 32a is applied on the appropriate lines, and is simultaneously transferred onto sections 32b, 32c, 32d, and 32e. The back face of tag section 32e is imprinted as shown in FIG. 15 for entry of miscellaneous information such as, the name of the person from whom purchased, or may be filled in later with the name of the salesman selling the car, and the name of the person to whom the car was sold. Being hard backed, the miscellaneous information will not print through on the tag sections 32d to 32a and the hard backed tag section forms a permanent record tag for use as hereinafter pointed out.

Additionally the lower portion of section 32b is completed by applying specific dates corresponding to the date information printed in area 37 of the respective day sheets of the specially coded calendar provided by this invention, one of the sheets 38 being shown in FIG. 6. The time limits imprinted on calendar sheets 38 represent the established stock turnover periods dating from the date the particular car is received for sale. These limit dates, indicating the time periods during which the green, yellow and red tag sections are to be displayed on board 10, prints through on tag sections 32c, 32d, and 32e. For example, the established stock turnover plan provides, as shown on calendar sheet 38, the green tag section 32b is to be displayed for a thirty day period from Jan. 21 until Feb. 19, the date written opposite green on tag sections 32b through 32e, indicating that the respective car received on Jan. 21 has been in stock less than the desired optimum thirty day turnover period. The yellow tag is to be displayed from Feb. 20 to March 21, the date written opposite "yellow" on tag sections 32b through 32e, indicating the car has been in stock for a time period exceeding the optimum thirty day disposal period and is approaching a troublesome time condition. Finally, the red label tag is to be displayed from March 22 on as a warning that the car has been in stock for an unacceptable period of time and that is is urgent that it be sold as it has become a high-risk business investment as a red label car. The final date opposite the word "red" on tag sections 32b to 32e may also be considered as the starting date for a reasonable period after which efforts to wholesale the car for different marketing disposal through automobile auctioning or other disposal.

For each day of the year, the time period information in area 37 on calendar 38 will advance by one day intervals beginning with the calendar date Jan. 1. The actual time periods in the area 37 may be varied as desired for different businesses, with the 30 day period illustrated only being for exemplary purposes.

After the appropriate information is placed on the tag sections when the car is readied for selling or is accepted for selling, white tag section 32a is placed in a key holder, such as the interfolded, thin clear plastic holder 70 of FIG. 8 to which the keys for the respective car are attached, with its through opening 30 aligned, with the through opening 73 along the upper edge and the key chain with car keys for the described car attached is threaded through the through aperture 76 and closed to condition the labeled key holder for hanging upright on a keyboard provided therefor. The green, yellow and red tag sections 32b, 32c and 32d are placed in order over a peg 31 (see FIG. 5) in the appropriate column and row on board 10 and tag section 32e is used to post a second board either at the main headquarters or another sales location for check purposes or for use in sales performance contests which may form a part of the disposal plan, in which case the tag section 32e will be hung on peg 31 as the bottom tag to be transferred as hereinafter pointed out. A clear plastic plate 40 (FIG. 5) is preferably placed in front of the tag sections on peg 31 to hold them firmly in place. The green and yellow tag sections are sequentially removed at the end of their respective indicated time periods as indicated by the color lining in FIG. 1 if the car is still in stock after the indicated expiration dates indicated thereon.

Alternatively, all the sections of tag pack 32 may be white and the color scheme on board 10 may be attained by employing green, yellow and red tinted transparent plates 40 which then would be periodically changed at the specified times written to correspond to the appropriate time period indicated on the respective tag sections.

The single-space column shown at the right of FIG. 1 and headed "Tot," is employed to indicate the total number of stock items "one hand" and "sold" as indicated by the tag sections displayed in each horizontal row and the grand total of stock items sold up to the date of header strip 13 indicated at the right end of the bottom horizontal row. In this connection, it will be noted that the third peg 31 of row three displays a circular tag 64, preferably metal bearing removable magnetic indicia, such as the numeral "3," a dollar sign for bonus, and R for reconditioning, or like miscellaneous information. The numeral tag shown indicates the single peg 31 contains two sets of tag sections 32b to 32d relating to two 1967 Chevrolets of substantially identical description. The square numeral tags 64a in the last row, preferably metal reusable tags, suspended from pegs 31 in the same manner as are tag sections 32b through 32d or magnetic indicia applied to board face 14.

While not essential, it is preferable that pegs 31 be provided with abutment collars or bases (see FIG. 5) which lie flush against the board face 14 to space the tag sections 32a to 32d slightly from board face 14 to make it easier to grasp and separate the tag sections when removal is required. In the screw in pegs 31 of FIG. 1, this collar or base may take the form of that provided by conventional cup hooks while the magnet base itself will provide the desired spacing if magnetic based pegs are used.

Referring now to FIG. 2, an arrangement of board 10 is illustrated to serve the needs of a new and used car dealership who maintains a sales performance system respecting its several salesmen. This alternate arrangement indicates the versatility of the present invention and the varying type information which may be visually displayed on the board merely by rearranging the vertical and horizontal divider strips 24.

As will be clear from a consideration of FIG. 2, where the same reference numerals are employed to indicate the same parts, a display board 10a is shown with the contrasting coloring of the margins of the board, the sectionalizing header strips 11 and 11a, and vertical divider strip 11b omitted. It is to be understood, however, that suitable identity of coloring between these header and divider strips may be employed to cause the divider strips or ribbons 24 to merge into the background coloring to visually enhance the columnar and row divisions of the board. In this embodiment of the invention, the board is divided into three main sections, namely, upper stock indicating area 20a to show new Cadillacs in stock, lower stock indicating area 20b to show used "trade in" cars in stock, and a vertical area 22a at the right to show sold card divided into vertical columns, the title blocks of which display the names of the respective salesman employed. These title blocks preferably comprise preformed strip assemblies (See FIG. 20) like that employed to form the title blocks of the columns and rows employed in FIG. 1 and the divider strips 11a and 11b are provided along their opposite long edges with screws 28 spaced to line up with screws 28 along the board's margin. The right-hand margin of board 10a and the divider strip 11b are additionally numbered, using magnetic or adhesive backed numbers, from bottom through row 2 opposite each row of board 10a to provide a quick sight reading of the number of cars sold by each salesman. The letter "T" opposite row 1 in each case stands for "total."

This board arrangement is designed for use particularly with the multileaved tag pack of FIGS. 14 and 15, an eight leaved tag pack providing four identical short length white tag sections 32a, a green colored vertically elongated tag section 32b, a yellow colored vertically elongated tag section 32c, a red colored vertically elongated tag section 32d, all formed of treated self-carbon-backed paper, and a hardboard white vertically elongated tag section 32e imprinted on the back face as indicated in FIG. 15. These tag sections are separable along perforated line 33 from marginal area 34 in substantially the same manner as the tag sections of the tag pack of FIG. 4. It will be noted that this tag pack omits the through aperture 30 of the tag pack of FIG. 4 for the reason that they are intended for use with tag holder 87 of FIGS. 16 and 17 and 95 of FIG. 13 to be presently described and key holder 70a of FIG. 9 or 70b of FIGS. 11 and 12 which are hereinafter described in detail.

Referring for the moment to FIGS. 9 and 10, key holder 70a comprises a rigid clear plastic holder having a tag receiving slot 72 dimensioned to receive a pair of short tag sections 32a in back-to-back relation and opening through the left end and terminating at inner end wall 73 short of the opposite end. The body inward from the left end is provided with a through rectangular slot 78 extending through the front and rear walls to freely pass a conventional separable key chain 79 hanging beneath the holder and the hanger bar 81 of noncircular cross section forming a part of support post 80 mounted on a key holder board (not shown) used in carrying out the information control system of the present invention. Since the key holder board can take any desired form and the attachment of the support post to the key holder board can be effected in many ways, it is sufficient for present purposes to state that the key holder board preferably comprises a board similar to the basic structure of FIGS. 1 or 2, namely, a wood base with a magnetic metal face or magnetic metal base. Support post 80 at its board attachment end comprises a circular magnet base 82 fixedly attached in any suitable manner to the inner end of the noncircular cross section hangar bar 81, shown here as being of rectangular configuration elongated vertically and dimensioned to freely but closely fit between the elongated sidewalls of slot 78 above the lower end which supports key chain 79. As best seen in FIG. 10, hangar bar 81 extends for a short distance away from magnet base 82 normal to the front face of base 82 and then slants upwardly and forwardly to form a slide section 84 tapering inwardly from its upper and lower edges to free end 86 to form an entry end of reduced vertical dimensions to assure easy entry into the upper area of slot 78 of key holder 70a. Assuming that a key board having posts 80 thereon in laterally spaced vertical rows is provided and that slot 78 of key holder 70a is positioned opposite post end 86 and entered into slot 78, and released, key holder 70a will slide down slide section 84 onto the short section of hangar bar 81 in abutting engagement with magnetic base 82 and come to rest and be maintained in position with the main body portion of key holder 70a extending at right angles to the side faces of hangar bar 81. Such automatic positioning of key holder 70a, assures that an upward and outward force will be required to remove the key holder and that one or the other of the side faces of key holder 70a will be facing outwardly from the key board with slot 72 lying in a plane generally parallel to the face of the keyboard.

Likewise, automatic proper positioning of the key holder 70b of FIGS. 11 and 12 designed for use with s similarly inclined circular hangar post is assured by its construction. Key holder 70b comprises a rigid clear plastic holder having a tag receiving slot 72a opening through the bottom edge as seen in FIGS. 11 and 12 and closed on both sides and closed at the top by the inner end wall 73a (FIG. 12) formed inwardly from its upper crescent-shaped end portion 75 through apertured at 73 on the vertical centerline to provide a centered hangar bar passage. The spaced body walls forming the front and back faces of key holder 70b are through apertured at 77 on the vertical centerline inwardly from its lower crescent-shaped end to provide a key chain passage.

Referring for the moment to FIGS. 16 and 17, tag holder 87 is formed of clear rigid plastic having a backwall 88 (FIG. 17) the main body portion of which is of rectangular configuration provided along its upper edge with a protuberant hangar formation 89 through apertured at 90 to provide a centered hangar bar passage. The lateral ends and bottom edge of the rectangular body portion are provided with integral, shallow, forwardly directed walls or ribs 91 carrying inwardly overhanging, marginal front wall segment 92 paralleling backwall 88 and forming with the backwall and sidewalls an open front pocket for receiving the marginal edges of tag sections 32b, 32c, 32d and, when desired, 32e as indicated by the dotted lines in FIGS. 16 and 17 readable through the open front when hung from an information control board peg 31 of the type heretofore described.

Tag holder 95 of FIG. 13 is identical to tag holder 70 of FIGS. 8 except that it omits through apertures 73 and 76 of tag holder 70. It is intended to receive a pair of tag sections 32a in back-to-back relation, when the tag pack of FIGS. 14 and 15 is employed, to provide a marking tag readable from opposite sides capable of being fixed by clear gummed tape to the vent window or other window area of the described car to relate the stock item itself to the information control board.

In using the key holders 70a or 70b and the tag holders 87 and 95 with the tag pack of FIGS. 14 and 15 and the informational control board of FIG. 2, the blank lines of the uppermost tag section 32a are filled in as hereinbefore described in using the tag pack of FIG. 4 and are imprinted simultaneously on the other tag sections 32a and 32b to 32e by reason of the self-carbon-backed paper employed. The time period expiration dates shown by calendar page 38 are then entered in the blank lines of tag section 32b exposed below tag sections 32i and are likewise simultaneously imprinted on tag sections 32c to 32e. If desired, the supplemental information provided for by the preprinted back face of hard board tag section 32e may then be applied or this tag section face may be left blank for later use as previously described. The tag sections are then separated from stub section 34 as heretofore described and the tag sections are distributed as follows:

Two tag sections 32a are placed back-to-back in either key holders 70a or 70b oriented to be readable through either face with the key chain and keys depending from slot 78 or through aperture 77 as the case may be. When these holders are then hung from the hangar bars of the appropriate key board support posts using slot 78 or aperture 73 as intended, the tag sections will be readily readable so the proper keys can be selected from the key board to demonstrate the car which a prospective customer may have selected. The remaining tag sections 32a are placed back-to-back in tag holder 95 (FIG. 13) which is then taped in place on a window area of the car described by the inserted tag sections. At the time of making this attachment of holder 95 the keys attached to the holder 70a or 70b containing the matching tag sections 32a can and should be checked by operating the keys in the doors and ignition to avoid future mixups.

Tag sections 32b, 32c and 32d are placed in inverse order on board pegs 31 or in tag holder 87, suspended from board pegs 31 when tag holders 87 form part of the system apparatus, to condition sales inventory control board 10a for visually displaying the newly added stock item. At the same time hard board tag section 32e with the initial back face information filled in, is either hung on the remote sales inventory control board heretofore described or, if the sales section of board 10a is being operated, is hung on the peg 31 of board 10a behind tag section 32d or disposed at the back of tag holder 87 for later shifting in accord with the disposal plan in use. Assuming the sales section of board 10a is being operated, the tag sections 32b to 32e will be left in place and periodic removal of tag sections 32b to 32d in sequence as heretofore described will be effected to keep the displayed information of board 10a current. Assuming the stock item recorded by the displayed tag sections is sold, the remaining tag sections 32b to 32d together with hard board tag section 32e are removed from the "in stock" section of board 10a, the hard board tag section 32e is inscribed on the back face with the sales information desired and transferred to pegs 31 in the sales section of board 10a in the column headed by the salesman's name who sold the car in sequence beginning at the bottom to indicate by reference to the adjacent numbering applied to divider strip 11b and the right margin of board 10a, the number of cars sold by each salesman up to the current date displayed on divider strip 11a. At the same time, an appropriately colored transparent plastic plate 40 is hung on peg 31 overlying the tag section 32e to show in the sales section the "in stock" period when the sale was made, and the correspondingly colored tag section 32b to 32d may be transferred to the salesman record file. The remaining tag sections may then be disposed of along with the tag sections 32a from tag holder 95 which is then ready for reuse. Normally the tag holder 70a or 70b containing the other tag sections 32a will be given to the purchaser. The reposted board 10a will then show the remaining inventory in stock and the sales section 22a will show the number of stock items sold by each salesman, the color plate in each case also showing the aging of the stock items sold by each salesman. By reference to sales section 22i, the performance record of each salesman will be visually depicted, the management may quickly evaluate the current value of each salesman to the organization from both a quantity sold and a general profit producing point of view.

The sales section 22a also permits management to establish and maintain a sales bonus program designed to dispose of overstocking of particular stock items, indicated by the appearance in certain rows of sections 20a and 20b of numerous yellow and red tag sections. For example, the board of FIG. 2 shows a total of 16 new two door Cadillacs (the total or rows 2 and 3) with row 2 displaying six red tag sections and three yellow tag sections. Upon such an overstocking showing up, an extra bonus can be offered by management for disposal of red tag two door Cadillacs. When such a red tag car is sold, the red tag indication will be removed from board section 20a and be shifted to the appropriate salesman's column in board section 22a and the fact that a bonus has been earned can be recorded on the back face of hard board tag section 32e transferred to and displayed in board section 22a. In this way, both management and the salesmen can currently keep track of bonus sales and the display will furnish an incentive to lagging salesmen to make bonus sales.

A similar bonus sales plan can be provided with a board arrangement generally like that of FIG. 1. Such a board arrangement is shown in FIG. 3 wherein the same reference characters indicate the same parts and the contrasting coloring of the margins, sectionalizing header strips 11 and 11a is omitted. In this form of the invention, the upper half of board 10b defining section 20 is identical to section 30 of FIG. 1. Header strip 12 of FIG. 1 is replaced by a header strip 11a like that of FIG. 2 of a length to extend between the margins at the left and right. Header strip 11a like that of FIG. 2 is provided with two rows of attachment screws 28 to accommodate the varying horizontal spacings of board sections 20 and 22 and the lettering on strip 11a has been modified to read "Sales Performance 9 21 68."

The upper horizontal row of board section 22, has been provided with a header strip reading "Units" and magnetic mountable numbered plates 40a, numbered 1 through 25, are placed in the upper row except for the last two at the right of the row. The numbered plate 25 is followed on the right by a plate bearing the letters TOT and the final space at the right end of the row carries a plate bearing the letters "YTD" designating total sales year to date. The succeeding downwardly related rows of board section 22 have been provided with header strips bearing the names of the several salesmen except for the bottom row where the header strip reads "Other."

In using board 10b, the "in stock" section is provided with column header strips reading "Chev," "Pont," "Buick," "Olds," "Cad," "Ford," "Merc," "Lin," "Ply," "Dodge," "Chry," "Misc," "Tot," denoting a used car business. The "in stock" section 20 is provided with inventory tag sections 32b through 32e as heretofore described. When a stock item is sold the tag sections for the sold car are removed from the board section 20 and distributed or destroyed as heretofore pointed out except that the hard board tag section 32e together with an appropriately colored transparent plate 40 is transferred to board section 22 being placed in the row headed by the name of the salesman making the sale. In cases where a sale has been consummated by management or through auction sales, the hardboard tag section 32e and its color plate are transferred to the row headed "Other." By referring to the numbers in the first row of board section 22, the number of cars sold during the current month can be readily visually noted and this total is confirmed by applying changeable magnetic or adhesive backed numbers in the second column from the right. The final column to the right of board section 22 is posted with similar changeable numbers indicating total sales for each row since the beginning of the year or such other period of time as may be dictated by the performance plan in use.

In any of the previously described display boards, the inventory system may be expanded to indicate anticipated stock items. To accomplish this purpose, the present invention contemplates tag sections 101 and 102 of FIGS. 18 and 19. These tag sections are preprinted similar to either FIG. 4 or FIGS. 14 and 15 composed of long tag sections similar to tag sections 32e but uncolored (white) respectively bearing indicia for inventorying in advance an expected used car trade in or a new car on order. The information given in each case will be clear from an inspection of FIGS. 18 and 19. When a trade in has been arranged for a later date or a new car is ordered, an appropriate tag, usually a single-tag section 101 or 102, or a pack including a hard board tag section like tag section 32e, is filled in and the tag sections are separated as previously described. The tag section 101 or 102 as the case may be is hung in board section 20 and the hard board tag section is placed in a followup file or other receptacle in the main office. From the display on the sales inventory control board, the distinctive white color will immediately visually indicate that the car described is not in stock but is expected to be in stock shortly and by reference to the data filled in the salesmen can ascertain the basic information respecting the car, including where it is coming from, the date it is expected and its principal descriptive features.

To further illustrate the versatility of the basic concept of the present invention, the fragmental board illustrations of FIGS. 21 and 22 respectively depict information control system boards arranged for use as an airline "Flight Arrival and Departure" display board and a trucking company "-Destination and Location" display board. In such usage the control board 10, comprises a base 12 and a plastic or thin metallic magnetic material face 14 divided into main title regions 16 and 18 and an information indicating area 120 as heretofore described. Area 120, as in the case of area 20 of the previously described boards, is divided by flexible extensible divider strips or ribbons 24 into a plurality of various sized vertical columns and horizontal rows. While end attached ring hooks 26 fitted over conical head screws 28 fixed in board face 14 as heretofore described may be used and are illustrated for the vertically disposed divider strips 24, strips 24 may take the form of endless bands encircling the entire board and fixed against lateral shifting by seating in respective notches 121 formed in the edges of the boards as shown in FIG. 21.

The column and row heads are preferably removably directly attached to board face 14 by magnetic or adhesively backed strips assemblies as previously described. While the more frequently changed informational material may be affixed directly to board face 14 by magnetic or adhesively backed preformed strip assemblies heretofore described, the embodiments of FIGS. 21 and 22 contemplate that they be hand applied using any suitable erasable black marking device. While hand writing applied directly to board face 14 is contemplated, to permits such hand marking and ready erasing without disturbing the column and row header strips and divider strips 24, these embodiments contemplate providing a clear plexiglass cover plate 122 dimensioned to overlie the entire board face 14 within the inner edges of the narrow marginal areas. To this end, the lower marginal area adjacent each end and the vertical marginal areas adjacent their upper ends respectively fixedly mount a protruding screw shank 123 adapted to freely receive a retainer block 124, the inner back edge of which is undercut to overlap the related marginal edge portions of cover plate 122, of lesser thickness than cover plate 122 and respective wing nuts 125 are provided to draw plate 122 firmly down upon board face 14. As a consequence, the writing is actually applied to the uninterrupted face of cover plate 122 using the visible strips 24 as a guide and may be individually or collectively erased and reposted as needed.

It will be clear from the preceding description that the present invention provides for the formation of any desired sectionalization of board face into information receiving areas or regions and that the several areas or regions may be individually sectionalized in rows, columns, or both of varying dimensions as the need occurs.

The overall board in all embodiments is maintained on a current status by periodically (preferably daily) visually inspecting the tags and altering the respective colors being displayed to correspond to the appropriate time period or erasing and reposting. The boards may be periodically photographed to provide up to date information for sales talks or meetings and/or to provide information for clerical use in preparing weekly, monthly, or like business records useful for inventory stocking conferences or trips, for comparing business performance for varying time periods, and projecting the future business picture.

It is understood, of course, that various modifications are contemplated within the spirit of the invention. For example, rather than using pegs 31 to hold tag sections 32b–32d or holders, therefore, on the board, the tag sections may be placed in suitable holders having a magnetized or adhesive backed base by which they are retained on the board. Additionally, the size of the various tags may be varied as desired for various type businesses. The margins of the board may be enlarged to provide marginal space for magnetized numbers which may be used to indicate the respective totals as in FIG. 2, thus eliminating the need for any special total columns in the respective indicating regions. As noted previously, the lettering and numbering in the respective columns may be applied by using magnetized elements or pressure sensitive paper either of which is readily attached and removed from the face 14. Instead of using only a single board, a number of boards may be used together to provide additional variations as needed or desired.

While the inventory system has been principally described with respect to the automobile sales business, it is understood that it is readily adaptable to other businesses merely by changing the titles in the columns and rows to correspond to the various stock items within the particular business involved.

Also, since the arrangement of the board is readily changeable it may be adapted for use in any type of business, e.g. real estate, boat sales, appliance dealers, etc., particularly those businesses in which a large number of items may be normally handled, as well as in trucking and air line operations as heretofore described.

In summary, it is readily apparent that the above described inventory control system including the novel inventory control board provides a very effective system for visually indicating up-to-date information with regard to business areas such as sales and inventory control, while eliminating the need of prolonged record studying, minimizing the amount of time required to keep records, and reducing the overall volume of records which otherwise must be maintained. The novel information control board is very versatile and flexible through the use of the various flexible extensible divider strips and the divider adapter plates which enable the informational areas to be readily varied in size as necessary to accommodate the various type information with respect to different type businesses. In addition, the combinations of the changeable board and the color coded tags immediately convey a visual picture of the operational conditions of the business and provides a warning when these conditions deviate from a predetermined desired business pattern.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What I claim and desire to be secured by Letters Patent is:

1. Information control apparatus comprising a display board having a display face, removable divider strip means including flexible extensible bands mounted on and extending substantially longitudinally and transversely over said display face for dividing at least a portion of said display face into respective sections of selectively variable dimensions, a plurality of substantially equally spaced locating members projecting from the peripheral margins of said display face permitting ready installation to and removal of said bands thereby enabling the dimensions of said sections to be readily varied, indicia means on said display face disposed to properly label said respective sections in a predetermined manner, and changeable identifying marking means disposed on said display face within appropriate ones of said respective sections, whereby immediate visual inspection provides an observer with the general overall information intended to be displayed.

2. Information control apparatus as in claim 1, wherein said indicia means comprises self-attaching plate means extending across said display face and dividing said display face into regions, said plate means having a plurality of substantially equally spaced locating members which may be aligned with opposite ones of said marginal locating members whereby the dimensions of the sections in each region may be independently varied by properly positioning and spacing appropriate bands between respective cooperating locating members.

3. Information control apparatus as defined in claim 2, wherein said locating members are headed screws having conically shaped under faces and cooperating hooks end mounted on said extensible bands so that said conical faces cam said hooks and said bands in a direction to substantially hug said display face and clearly and accurately define said sections.

4. Information control apparatus as defined in claim 1, wherein said apparatus is arranged as a sales and inventory control board, said marking means comprises respective sets of tag sections each containing identical information and certain of which are oversized to record day dates defining predetermined in stock time periods for the inventory item represented by said sets of tag sections whereby when all the inventory items are represented by respective sets of tag sections on said display face, an accurate determination of the sales and inventory status of a business is readily visually obtainable from the board.

5. Information control apparatus as defined in claim 4, wherein said respective tag sections of each set of tag sections is displayed in a distinctive color determined by the dating thereon.

6. Information control apparatus as defined in claim 4, wherein said respective tag sections are a common neutral color and a colored display is effected by a plurality of transparent cover plates each tinted a different color and applied in overlying relation to said tag sections in accord with the dates thereon.

7. Information control apparatus as defined in claim 5, wherein the dating of said tag sections is effected from predated color coding imprinted on respective day sections of a calendar page.

8. Information control apparatus as in claim 1, wherein said changeable identifying marking means comprises a plexiglass cover plate dimensioned to overly said display face and said indicia means within a peripheral border of said display face and provide a writing surface delimited into respective writing sections by said divider strip means and peripherally spaced retainer blocks adjustably fixed in said peripheral border of said display face to retain said cover plate in place over said display face and said indicia means.

9. Information control apparatus comprising a display board having a display face, removable divider strip means including flexible extensible bands mounted on and extending substantially longitudinally and transversely over said display face for dividing at least a portion of said display face into respective sections of selectively variable dimensions, a plurality of substantially equally spaced locating means arranged around the peripheral margins of said display face permitting ready installation to and removal of said bands thereby enabling the dimensions of said sections to be readily varied, indicia means on said display face disposed to properly label said respective sections in a predetermined manner, and changeable identifying marking means disposed on said display face within appropriate ones of said respective sections, whereby immediate visual inspection provides an observer with the general overall information intended to be displayed.